United States Patent
Li et al.

(10) Patent No.: US 11,156,748 B2
(45) Date of Patent: Oct. 26, 2021

(54) OMNIDIRECTIONAL STRUCTURED LIGHT PROJECTION

(71) Applicant: LENOVO (Singapore) PTE. LTD., New Tech Park (SG)

(72) Inventors: Scott Wentao Li, Cary, NC (US); Robert James Kapinos, Durham, NC (US); Russell Speight VanBlon, Raleigh, NC (US); Robert James Norton, Jr., Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/575,074

(22) Filed: Sep. 18, 2019

(65) Prior Publication Data

US 2021/0080625 A1    Mar. 18, 2021

(51) Int. Cl.
G02B 5/08       (2006.01)
G02B 5/00       (2006.01)
H04N 5/225      (2006.01)
H04N 5/232      (2006.01)

(52) U.S. Cl.
CPC .............. G02B 5/08 (2013.01); G02B 5/005 (2013.01); H04N 5/2254 (2013.01); H04N 5/23238 (2013.01)

(58) Field of Classification Search
CPC ........ G02B 5/08; G02B 5/005; H04N 5/2254; H04N 5/23238
See application file for complete search history.

(56) References Cited

U.S. PATENT DOCUMENTS

| 4,976,524 A * | 12/1990 | Chiba .................... G02B 13/06 359/708 |
| 2011/0301418 A1* | 12/2011 | Gharib ................. A61B 5/0073 600/181 |
| 2012/0281071 A1* | 11/2012 | Bergman ........... A61B 1/00016 348/46 |
| 2012/0302828 A1* | 11/2012 | Toledo-Crow ......... A61B 18/24 600/108 |
| 2016/0048011 A1* | 2/2016 | Suzuki ................. G02B 21/086 348/79 |
| 2016/0178356 A1* | 6/2016 | Lefebvre ................ G01B 11/12 356/601 |
| 2017/0243373 A1* | 8/2017 | Bevensee ................ G01S 17/08 |
| 2018/0213207 A1* | 7/2018 | Wilson ............... A61B 1/00096 |
| 2019/0130589 A1* | 5/2019 | Fu ....................... G01B 11/2513 |
| 2020/0280668 A1* | 9/2020 | Park ...................... H04N 5/2352 |

OTHER PUBLICATIONS

Song, Zhan et al "DOE-based structured-light method for accurate 3D sensing", Optics and Lasers in Engineering, vol. 120, Sep. 2019, pp. 21-30 (Year: 2019).*

Akito Takeya, Takeshi Kuroda, Ken-Ichi Nishiguchi, Akira Ichikawa, "Omnidirectional vision system using two mirrors," Proc. SPIE 3430, Novel Optical Systems and Large-Aperture Imaging, (Dec. 8, 1998); https://doi.org/10.1117/12.332486 (Year: 1998).*

* cited by examiner

*Primary Examiner* — Michael Robert Cammarata
(74) *Attorney, Agent, or Firm* — Kunzler Bean & Adamson (57) ABSTRACT

For omnidirectional structured light projection, a light source illuminates a conical mirror towards an apex along a central axis. A pattern mask corrects a deformation pattern of the conical mirror to form a plurality of points in a point cloud from the light source.

14 Claims, 10 Drawing Sheets

Bottom view of conical mirror with sintered surface

OMNIDIRECTIONAL STRUCTURED LIGHT PROJECTION

FIELD

The subject matter disclosed herein relates to structured light projection and more particularly relates to omnidirectional structured light projection.

BACKGROUND

Scanning applications may need a point cloud.

BRIEF SUMMARY

An apparatus for omnidirectional structured light projection is disclosed. The apparatus includes a conical mirror, a light source, and a pattern mask. The conical mirror includes a base and an apex. The light source illuminates the conical mirror towards the apex along a central axis. The pattern mask corrects a deformation pattern of the conical mirror to form a plurality of points in a point cloud from the light source. A system and method also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
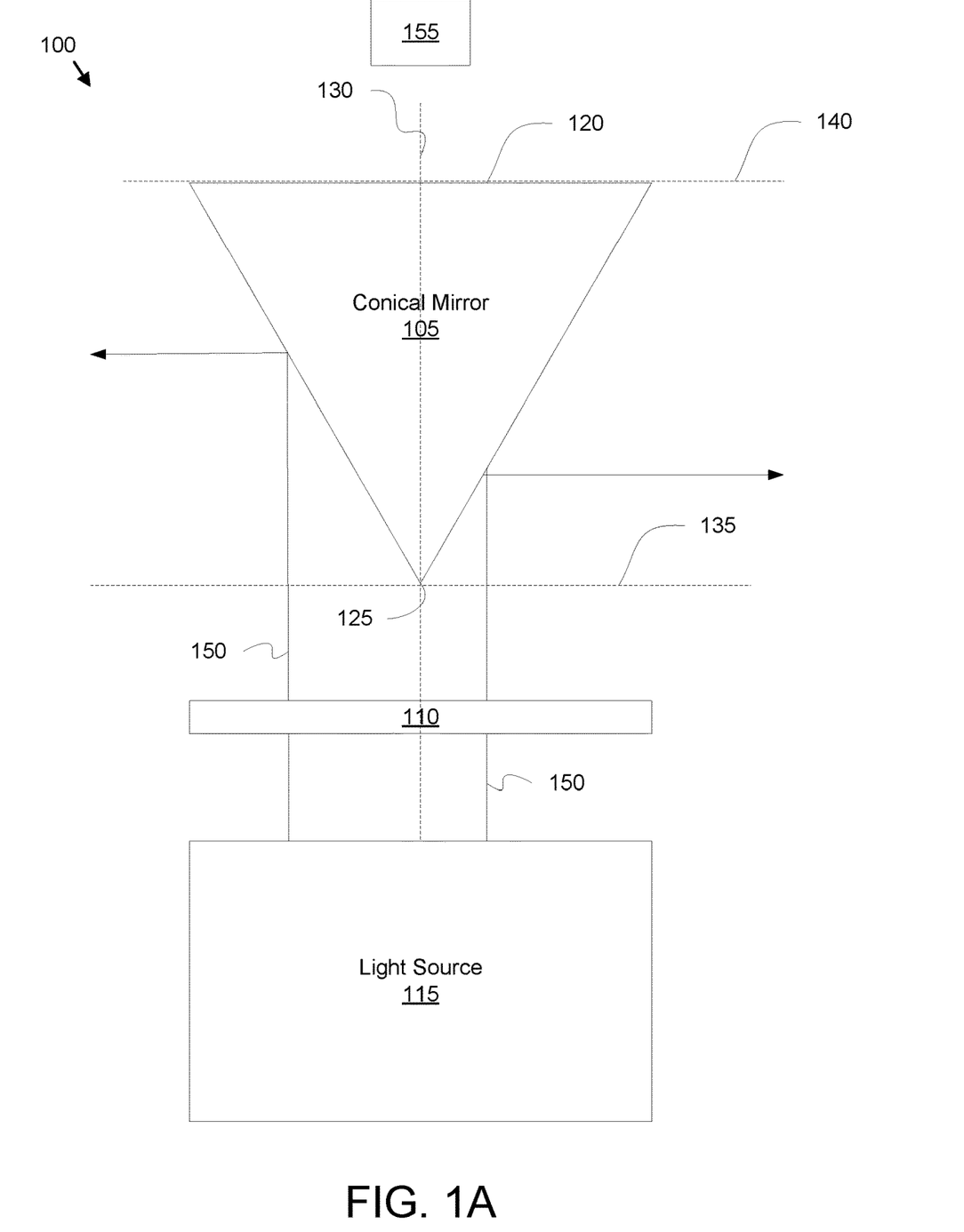
FIG. 1A is a schematic side view diagram illustrating one embodiment of a light projection system.

FIG. 1A is a schematic side view diagram illustrating one embodiment of a light projection system 100. The light projection system 100 may project structured light in an environment. In one embodiment, the structured light includes points in a point cloud. The structured light may be used to scan the environment. For example, each point of the point cloud may be along a known vector from the light projection system 100. By detecting the points on objects of the environment, the light projection system 100 may determine the location of objects in the environment.

In the depicted embodiment, the light projection system 100 includes a conical mirror 105, a light source 115, and a pattern mask 110. The conical mirror 105 may have a cone geometry. In addition, the geometry of the conical mirror 105 may be modified from a cone geometry with one or more curves. The geometry of the conical mirror 105 is described in more detail in FIGS. 3A-B. The surface of the conical mirror 105 may be mirrored. Alternatively, the surface of the conical mirror 105 may be partially mirrored.

The light source 115 may be an infrared laser. In addition, the light source 115 may be a visible light laser. In a certain embodiment, the light source 115 is a collimated light source.

The light projection system may include a camera 155. The camera 155 may capture a 360 degree image of the point cloud in the environment. In addition, the camera 155 may capture a portion of a 360° image of the point cloud in the environment. In a certain embodiment, the camera 155 captures infrared images.

In one embodiment, the conical mirror 105 is centered on a central axis 130. The conical mirror 105 may include an apex 125 and a base 120. An apex plane 135 may pass through the apex 125 and be perpendicular to the central axis 130. A base plane 140 may be coplanar with the base 120 and perpendicular to the central axis 130.

The light source 115 may illuminate the conical mirror 105 along the central axis 130. The light source 115 may illuminate the conical mirror 105 towards the apex 125 along the central access 130 to create the points of the point cloud. The points may be dots of light, patterns of light, points of light, and the like. Unfortunately, light rays 150 from the light source 115 may generate a deformed pattern of points in the surrounding environment because of the geometry of the conical mirror 105. The pattern mask 110 may correct the deformation pattern of the conical mirror 105 to form the plurality of points in the point cloud from the light source 115. As a result, the points of the point cloud are more suitable for scanning applications as will be described hereafter.

In the depicted embodiment, the pattern mask 110 is disposed between the light source 115 and the conical mirror 105. A plurality of light rays 150 from the light source 115 pass through the pattern mask 110 and are reflected from the conical mirror 105 to form the plurality of points in the point cloud. The pattern mask 110 is described in more detail in FIG. 4A.

Figure 1B:
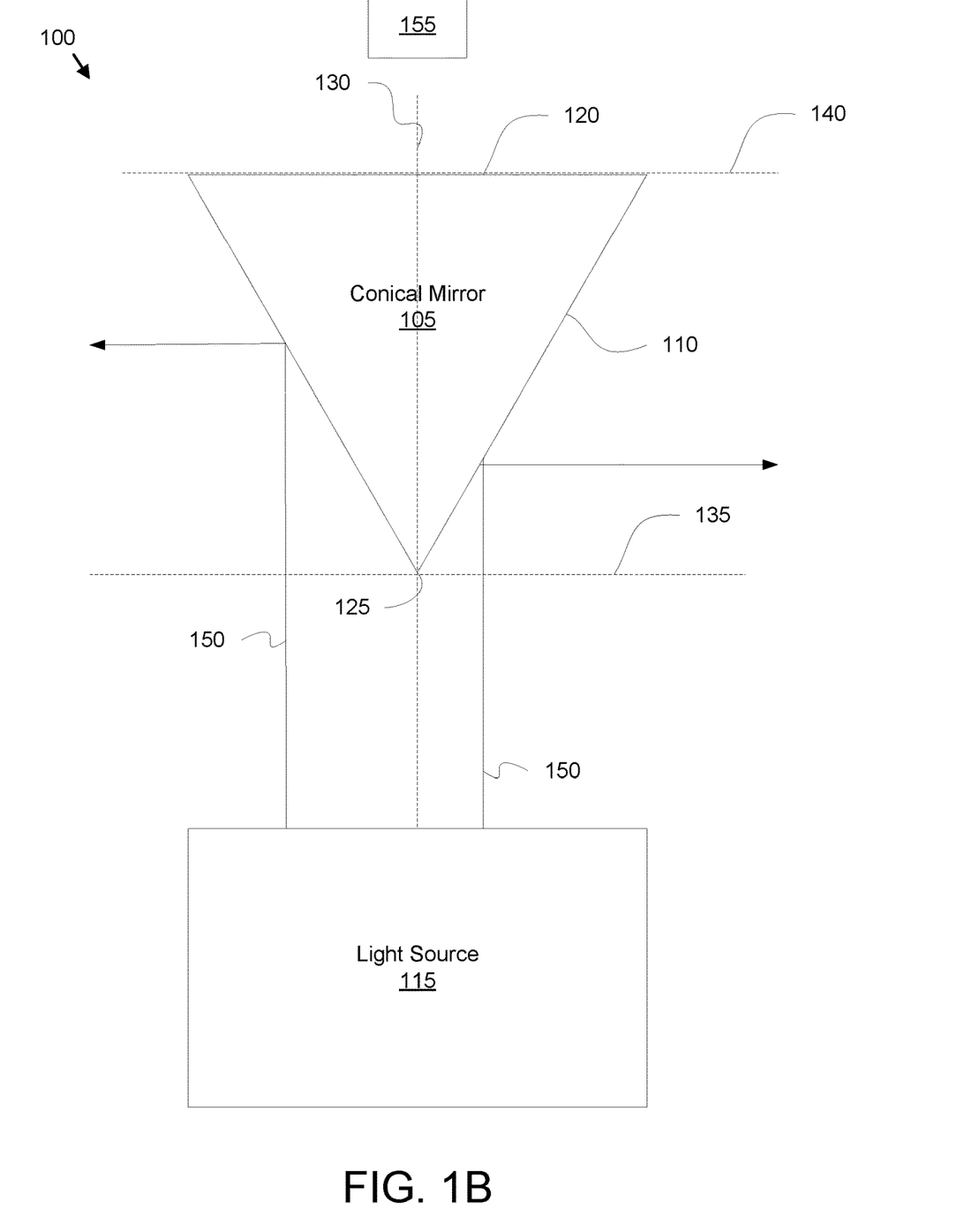
FIG. 1B is a schematic side view diagram illustrating one alternate embodiment of a light projection system.

FIG. 1B is a schematic side view diagram illustrating one alternate embodiment of the light projection system 100. In the depicted embodiment, the light projection system 100 includes the light source 115 and the conical mirror 105 of FIG. 1A. In addition, the pattern mask 110 is deposited on the conical mirror 105 to form a plurality of reflective surfaces. In one embodiment, a reflective surface of the conical mirror 105 is sintered in some areas so that the sintered areas do not reflect light. The sintered areas and areas of the reflective surface of the conical mirror 105 that remain un-sintered may form the pattern mask 110. The reflective surfaces may be arranged to correct the deformation pattern of the conical mirror 105. The plurality of light rays 150 may be reflected from the reflective surfaces to form the plurality of points in the point cloud.

Figure 2:
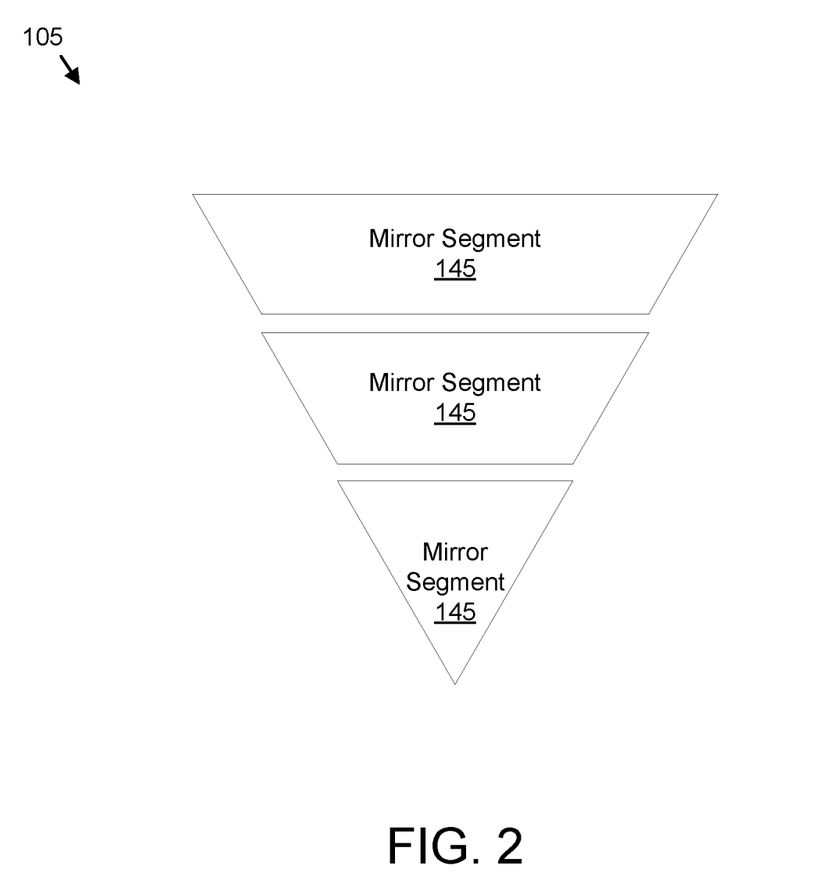
FIG. 2 is a side view diagram illustrating one embodiment of a conical mirror.

FIG. 2 is a side view diagram illustrating one embodiment of the conical mirror 105. In the depicted embodiment, the conical mirror 105 comprises a plurality of mirror segments 145. Three mirror segments 145 are shown. However, any number of mirror segments 145 may be employed.

Figure 3A:
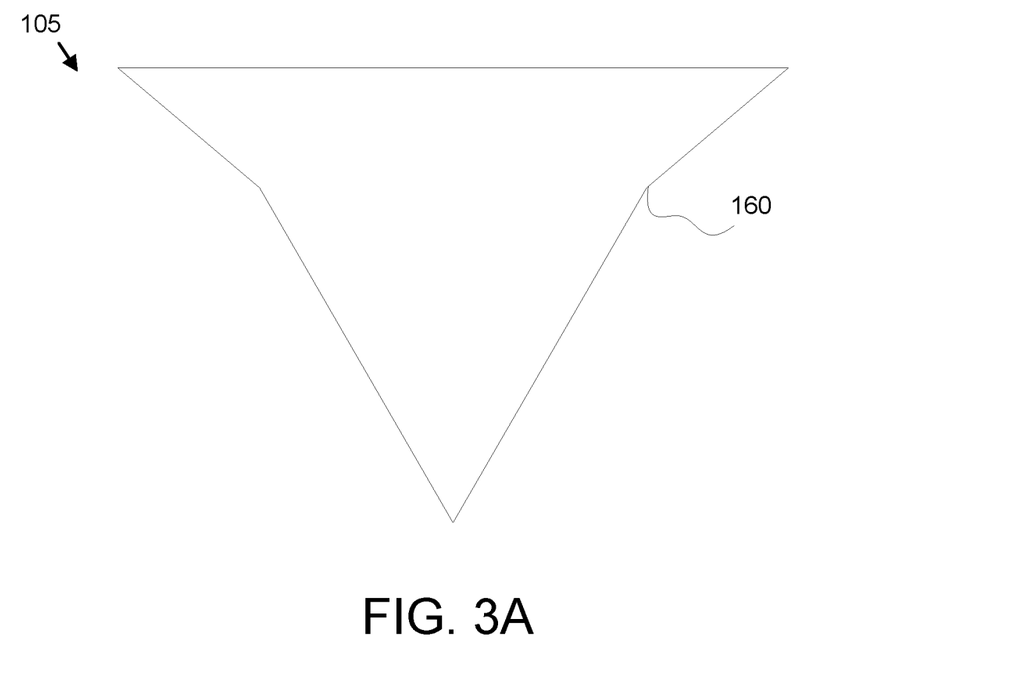
FIG. 3A is a side view diagram illustrating one embodiment of a modified conical mirror.

FIG. 3A is a side view diagram illustrating one embodiment of a modified conical mirror 105. In the depicted embodiment, the geometry of the conical mirror 105 is modified with the curve 160. The curve 160 may change the distribution of the points of the point cloud. In one embodiment, the conical mirror 105 is modified with the curve 160 to increase points below the apex plane 135. In addition, the curve 160 may be formed to increase points above the base plane 140.

In a certain embodiment, the conical mirror 105 is modified with the curve 160 to increase the distribution of the points between the base plane 140 and the apex plane 135. In one embodiment, the conical mirror 105 is modified to increase the distribution of points in a specified direction.

Figure 3B:
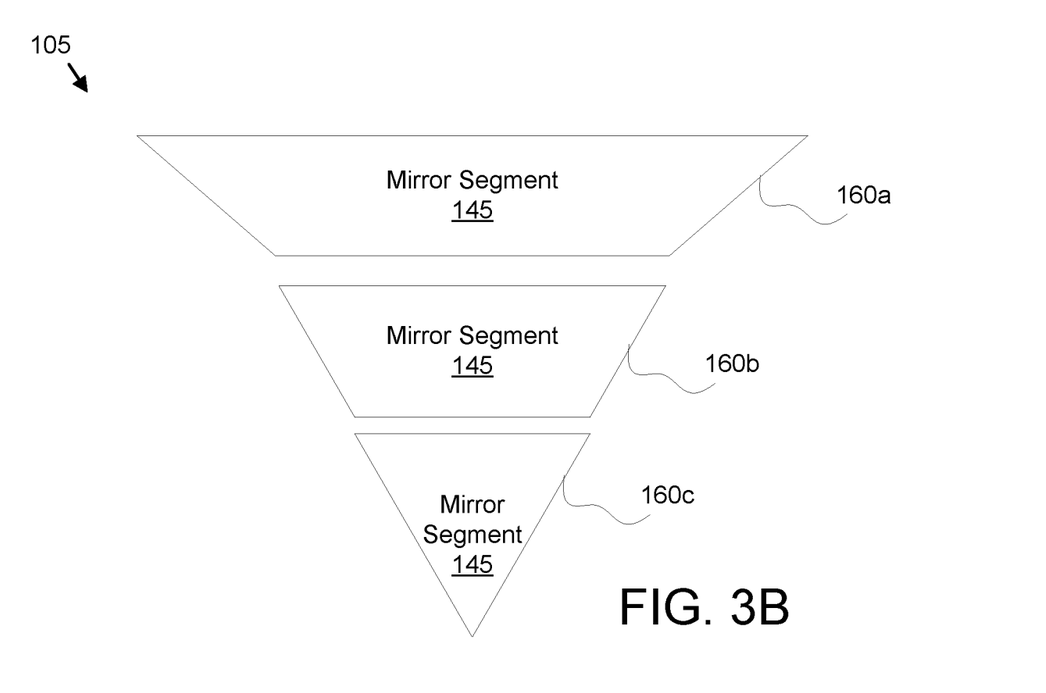
FIG. 3B is a side view diagram illustrating one alternate embodiment of a modified conical mirror.

FIG. 3B is a side view diagram illustrating one alternate embodiment of a modified conical mirror 105. In the depicted embodiment, the modified conical mirror 105 comprises a plurality of mirror segments 145. In one embodiment, each mirror segment 145 includes curve 160a-c.

Figure 4A:
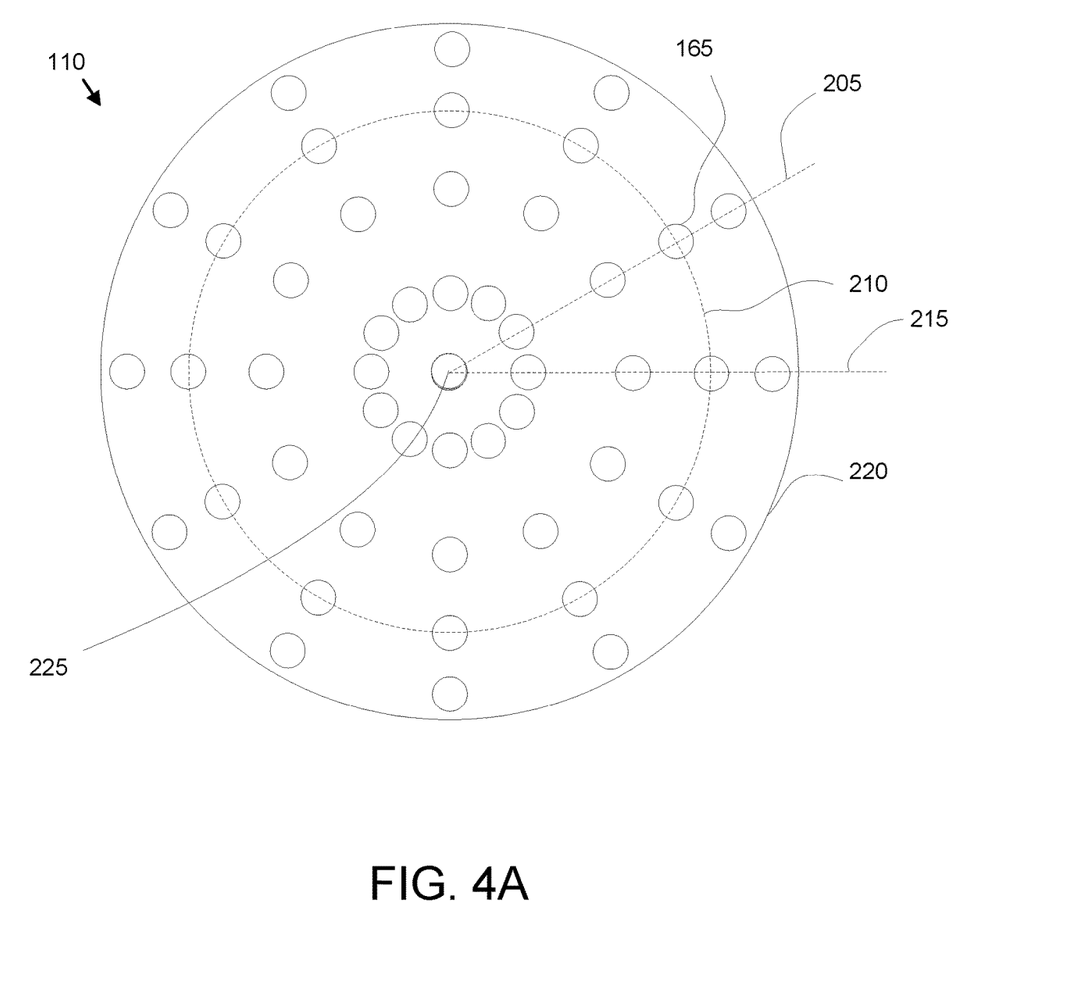
FIG. 4A is a top view diagram illustrating one embodiment of a pattern mask.

FIG. 4A is a top view diagram illustrating one embodiment of a pattern mask 110. The pattern mask 110 may comprise a plurality of light orifices 165 that each pass a light ray 150 from the light source 115 to the conical mirror 105. The light orifices 165 may be round. In addition, the light orifices 165 may be a pattern. The plurality of light orifices 165 are arranged to correct a deformation pattern of the conical mirror 105, wherein the plurality of light rays 150 are reflected from the conical mirror 105 to form the plurality of points 170 in the point cloud 180. The deformation pattern may be a difference between a desired point distribution of the plurality of points in the point cloud and the points that would be generated without the pattern mask 110.

In one embodiment, the position of each light orifice 165 in the pattern mask 110 has a radial angle $\lambda_1$ 205 relative to a reference angle $\lambda_0$ 215 and a latitude $\lambda_2$ 210 relative to the center. In one embodiment, the radial angle $\lambda_1$ 205 and the latitude $\lambda_2$ 210 are calculated using Equations 1-6, wherein x is a first axis coordinate, y is a second axis coordinate, and x and y form a vector parallel to the central axis 130. $\varphi$ is a point latitude, $\varphi_1$ is a first standard parallel 220, and $\varphi_2$ is a second standard parallel 225.

$$\lambda_1 = \frac{\sin^{-1}\left(\frac{x}{\rho}\right)}{n} + \lambda_0 \qquad \text{Equation 1}$$

$$\lambda_2 = \frac{\cos^{-1}(\rho_0 - y)}{n} + \lambda_0 \qquad \text{Equation 2}$$

$$\rho = F \cot^n\left(\frac{1}{4}\pi + \frac{1}{2}\varphi\right) \qquad \text{Equation 3}$$

$$\rho_0 = F \cot^n\left(\frac{1}{4}\pi + \frac{1}{2}\varphi\right) \qquad \text{Equation 4}$$

$$F = \frac{\cos \varphi_1 \tan^n\left(\frac{1}{4}\pi + \frac{1}{2}\varphi_1\right)}{n} \qquad \text{Equation 5}$$

$$n = \frac{\ln(\cos \varphi_1 \sec \varphi_2)}{\ln\left[\tan\left(\frac{1}{4}\pi + \frac{1}{2}\varphi_2\right) \cot\left(\frac{1}{4}\pi + \frac{1}{2}\varphi_1\right)\right]} \qquad \text{Equation 6}$$

In an alternative embodiment, the light orifices 165 are arranged so that the light rays 150 are organized in a pseudorandom pattern. In one embodiment, the light orifices 165 are positioned using Equations 7 and 8, where rnd is a random number between zero and one.

$$\lambda_1 = \varphi_1 \cos \pi rnd \qquad \text{Equation 7}$$

$$\lambda_2 = 2\pi rnd \qquad \text{Equation 8}$$

Figure 4B:
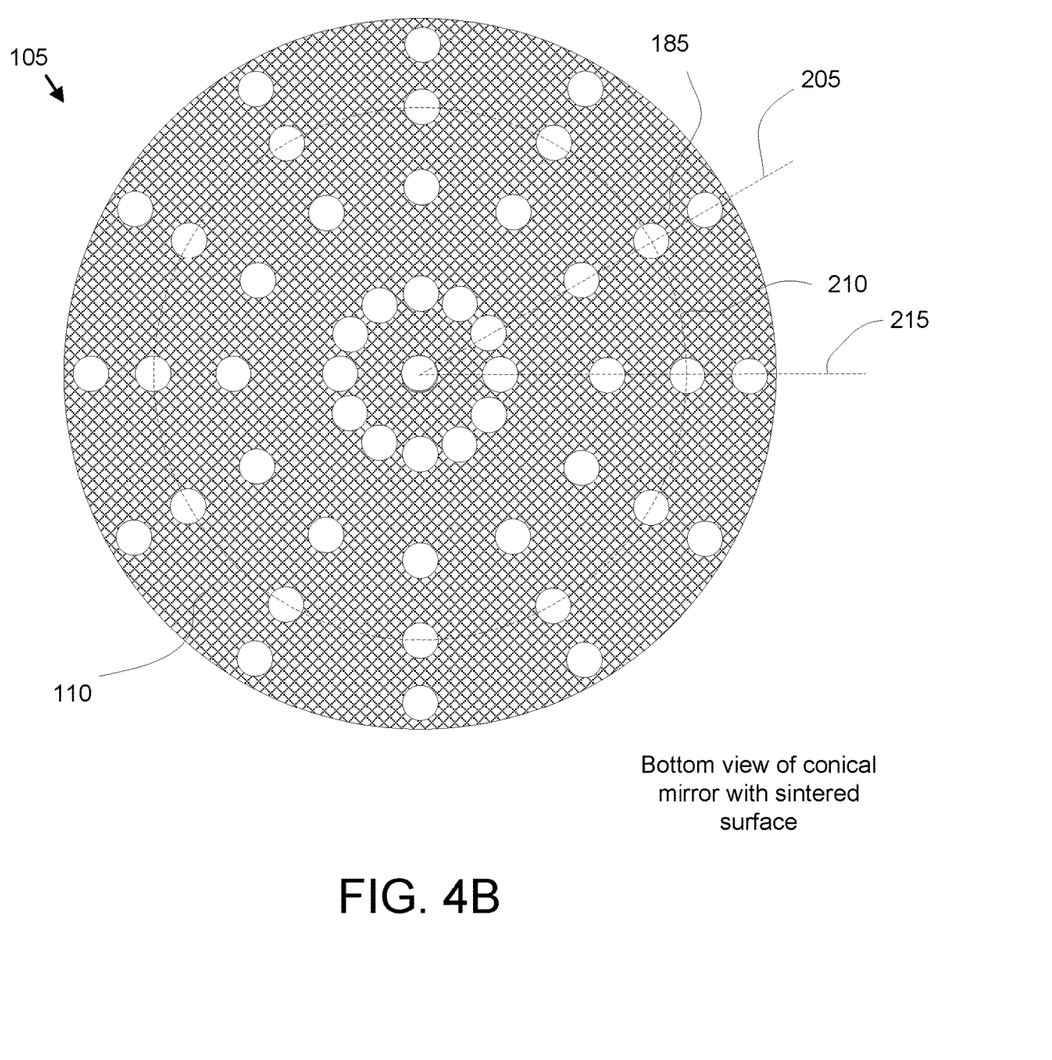
FIG. 4B is a bottom view diagram illustrating one embodiment of a conical mirror.

FIG. 4B is a bottom view diagram illustrating one embodiment of the conical mirror 105. The conical mirror 105 is viewed from the bottom along the central axis 130. The pattern mask 110 is formed on the conical mirror 105 with a plurality of reflective surfaces 185 arranged to correct the deformation pattern of the conical mirror 105. The plurality of light rays 150 are reflected from the reflective surfaces 185 to form the plurality of points in the point cloud. In the depicted embodiment, the pattern mask 110 is formed on the surface of the conical mirror 105. In one embodiment, the surface of the conical mirror 105 is laser sintered to form the pattern mask 110 with the reflective surfaces 185 that continue to reflect the light rays 150 from the light source 115.

In an alternate embodiment, the pattern mask 110 is a non-reflective material that is applied to the surface of the conical mirror 105 except at the reflective surfaces 185. In a certain embodiment, the conical mirror 105 is not reflective and the pattern mask 110 comprises the reflective surfaces 185. The reflective surfaces 185 may be applied to the conical mirror 105.

The location of the reflective surfaces 185 may be determined using Equations 1-6. In addition, the reflective surfaces 185 may be determined using Equations 7-8.

Figure 5:
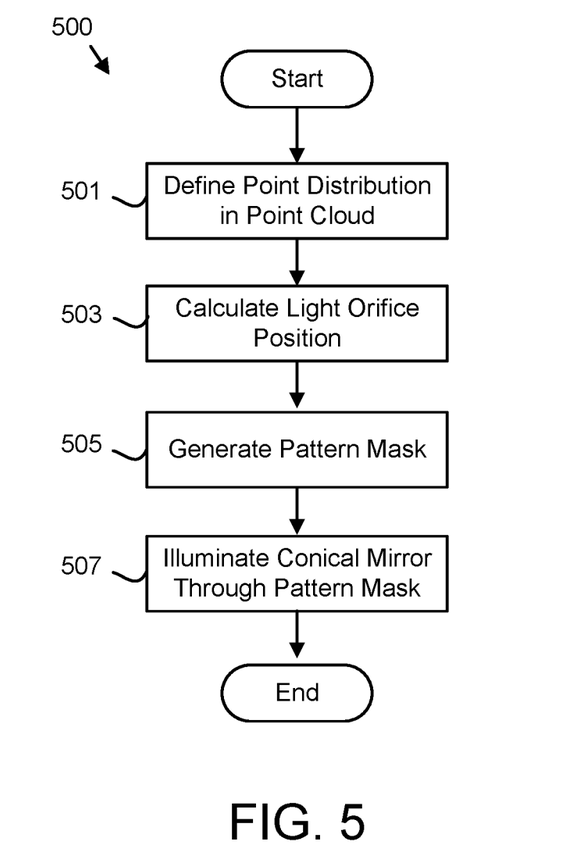
FIG. 5 is a schematic flow chart diagram illustrating one embodiment of a light projection method.

FIG. 5 is a schematic flow chart diagram illustrating one embodiment of a light projection method 500. The method 500 may form a plurality of points in a point cloud by illuminating the conical mirror 105 with the light source 115 and using the pattern mask 110 to correct the deformation pattern of the conical mirror 105. The method 500 may be performed by the light projection system 100 and/or a computer.

The method 500 starts, and in one embodiment, a processor defines 501 a point distribution for the point cloud. The point distribution may be defined 501 so that points have a higher density below the apex plane 135. In addition, the point distribution may be defined 501 so that points have a higher density above the base plane 140. In one embodiment, the point distribution is defined 501 so that points have a higher density between the apex plane 135 and the base plane 140.

In one embodiment, the point distribution is defined 501 so that adjacent light rays 150 are separated by a pattern distance. In a certain embodiment, the plurality of points from the light rays 150 have a higher density at an edge of the pattern mask 110 than a center of the pattern mask 110.

In one embodiment, the point distribution is defined 501 as a pseudorandom point distribution. As a result, the point distribution may be defined 501 from a series of pseudorandom numbers.

The processor may calculate 503 the position of the light orifices 165 and/or reflective surfaces 185 of the pattern mask 110. In one embodiment, the positions of the light orifices 165 and/or reflective surfaces 185 are calculated 503 using Equations 1-6. In addition, the positions of the light orifices 165 and/or reflective surfaces 185 may be calculated 503 using Equations 7-8. In addition, the processor may calculate 503 curves 160 that result in the desired point distribution.

The processor may generate 505 the pattern mask 110. In one embodiment, the processor generates 505 a numeric file for fabricating the pattern mask 110. For example, a machine tool may employ the numeric file to bore the light orifices 165. In addition, a laser may employ the numeric file to sinter the conical mirror 105. In one embodiment, processor generates 505 a photolithography mask for fabricating the pattern mask 110.

The light source 115 may illuminate 507 the conical mirror 105 through the pattern mask 110 to form the plurality of points in the point cloud and the method 500 ends. The pattern mask 110 corrects the deformation pattern of the conical mirror 105 to achieve the desired point distribution in the point cloud.

Figure 6:
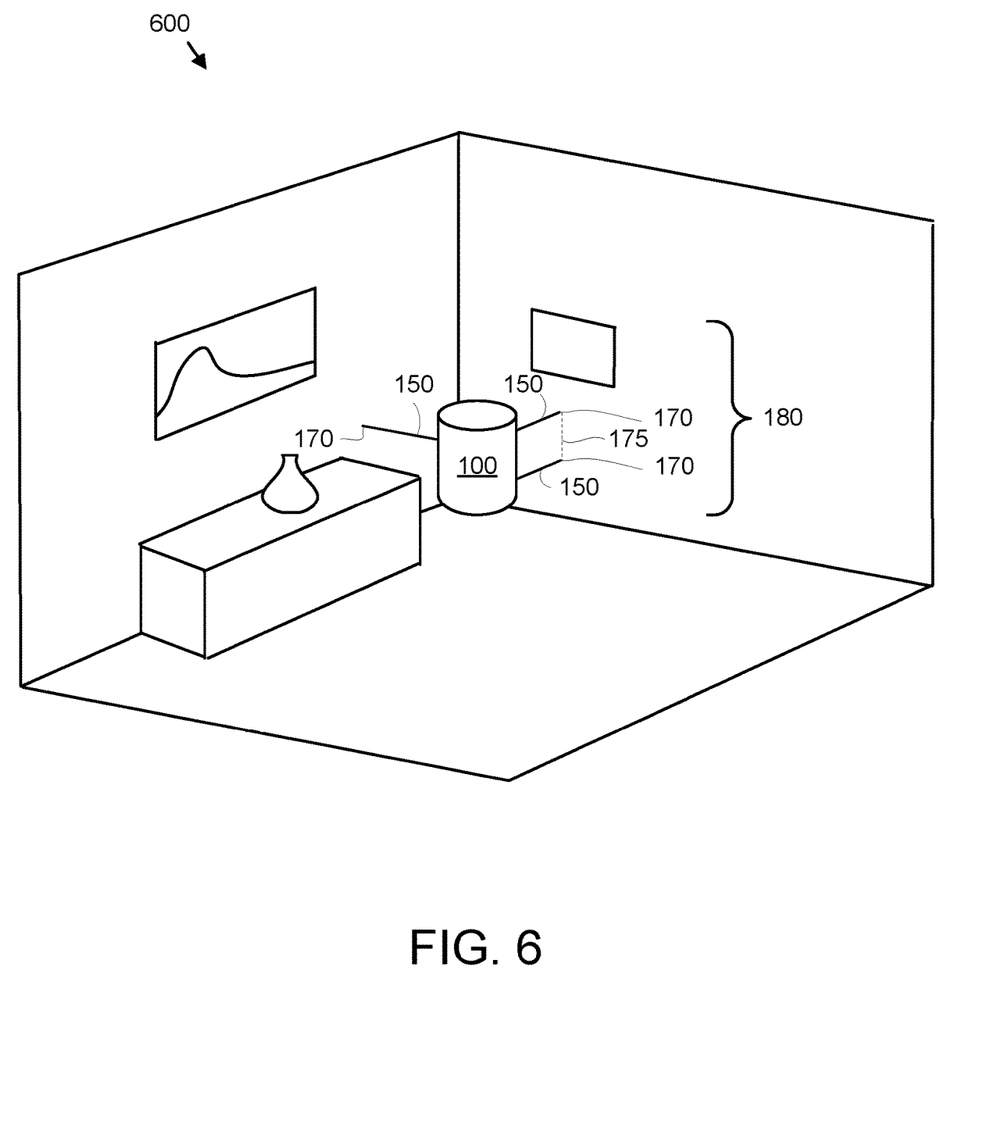
FIG. 6 is a perspective drawing illustrating one embodiment of a light projection environment.

FIG. 6 is a schematic flow chart diagram illustrating one embodiment of a light projection environment 600. In the depicted embodiment, the light projection system 100 generates a plurality of light rays 150. The light rays 150 strike objects in the environment 600 at points 170. The plurality of points 170 form the point cloud 180. In the depicted embodiment, adjacent light rays 150 are separated by a pattern distance 175. The pattern distance 175 may be a specified range. In one embodiment, the pattern mask 110 corrects the deformation pattern of the conical mirror 150 so that the pattern distances 175 are within the specified range.

Figure 7:
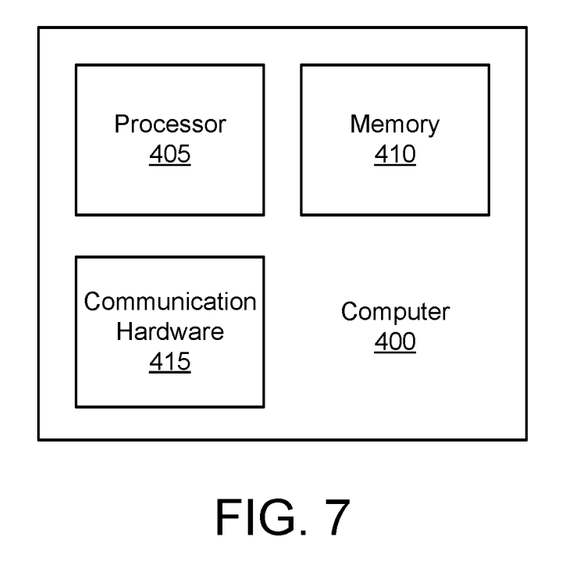
FIG. 7 is a schematic block diagram illustrating one embodiment of a computer.

FIG. 7 is a schematic block diagram illustrating one embodiment of a computer 400. In the depicted embodiment, the computer 400 includes the processor 405, a memory 410, and communication hardware 415. The memory 410 may include a semiconductor storage device, a hard disk drive, or combinations thereof. The memory 410 may store code. The processor 405 may execute the code. The communication hardware 415 may communicate with other devices. For example, the communication hardware 415 may communicate the numerical file to a machine tool.

Figure 8:
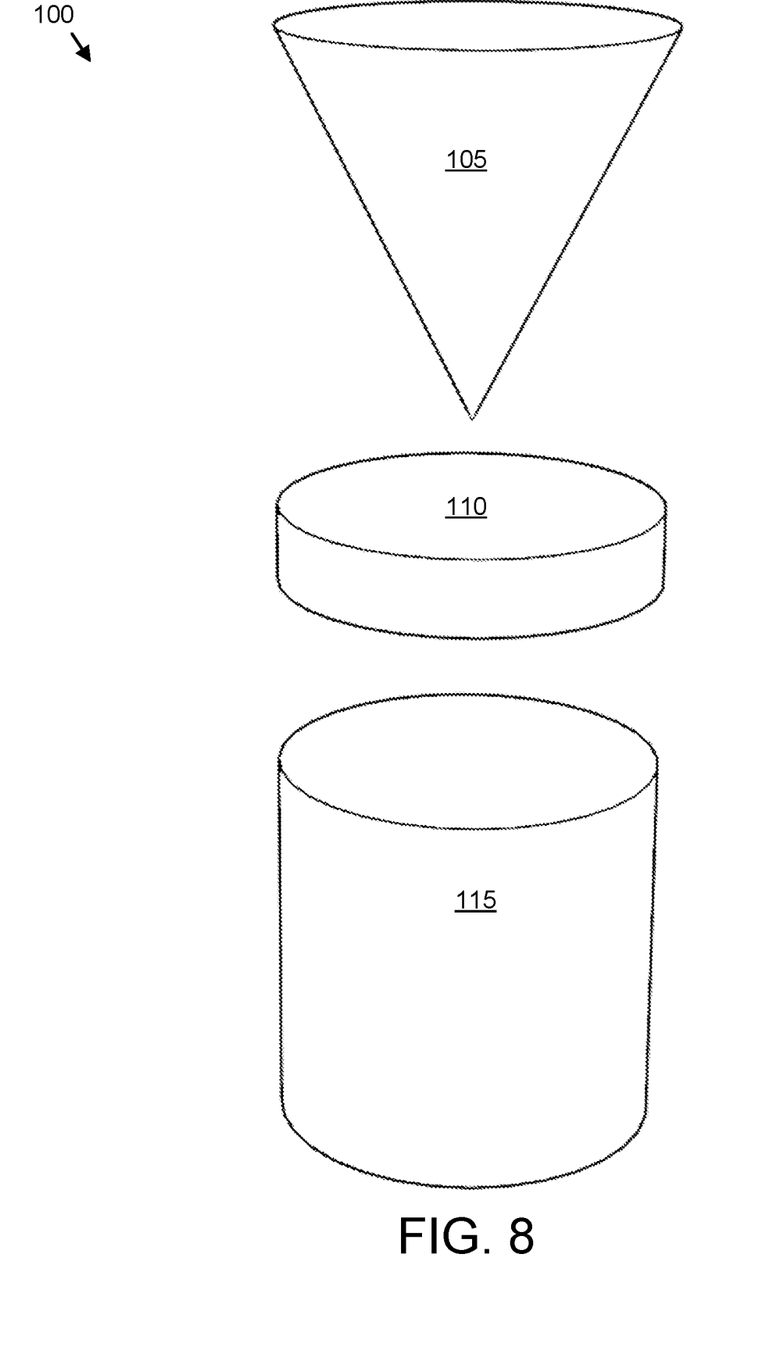
FIG. 8 is a perspective drawing illustrating one embodiment of a light projection system.

FIG. 8 is a perspective drawing of the light projection system 100 showing the conical mirror 105, the pattern mask 110, and the light source 115.

The embodiments form plurality of points 170 in the point cloud 180 by illuminating the conical mirror 150 with the light source 115. The pattern mask 110 forms points 170 using light orifices 165 and/or reflective surfaces 185. The pattern mask corrects the deformation pattern of the conical mirror 105 to place the plurality of points 170 according to the desired point distribution. As a result, the light projection system 100 cost-effectively generates the plurality of points 170 of the point cloud 180. The points 170 may be used to spatially locate objects within the environment 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a conical mirror comprising a base and an apex;
   a light source that illuminates the conical mirror towards the apex along a central axis; and
   a pattern mask disposed between the light source and the conical mirror, the pattern mask structured with a plurality of light orifices that each pass a light ray from the light source to the conical mirror, the plurality of light orifices arranged to correct a deformation pattern of the conical mirror wherein a latitude of each light orifice is calculated as an arc cosine of a coordinate of a vector parallel a central axis, and a plurality of light rays are reflected from the conical mirror to form a plurality of points in a point cloud.

2. The apparatus of claim 1, wherein the conical mirror is structured with a curve to increase points below an apex plane, wherein the apex plane passes through the apex and is perpendicular to the central axis.

3. The apparatus of claim 1, wherein the plurality of light orifices are organized in a pseudorandom pattern.

4. The apparatus of claim 3, wherein the plurality of points from the light orifices have a higher density at an edge of the pattern mask than a center of the pattern mask.

5. The apparatus of claim 1, wherein the points from adjacent light orifices are separated by a pattern distance in the point cloud.

6. The apparatus of claim 1, wherein the light source is an infrared laser.

7. The apparatus of claim 1, the apparatus further comprising a camera that captures a 360 degree image of the point cloud.

8. A system comprising:
a conical mirror comprising a base and an apex;
a light source that illuminates the conical mirror towards the apex along a central axis;
a pattern mask disposed between the light source and the conical mirror, the pattern mask structured with a plurality of light orifices that each pass a light ray from the light source to the conical mirror, the plurality of light orifices arranged to correct a deformation pattern of the conical mirror wherein a latitude of each light orifice is calculated as an arc cosine of a coordinate of a vector parallel a central axis, and a plurality of light rays are reflected from the conical mirror to form a plurality of points in a point cloud; and
a camera that captures a 360 degree image of the point cloud.

9. The system of claim 8, wherein the conical mirror is structured with a curve to increase points below an apex plane, wherein the apex plane passes through the apex and is perpendicular to the central axis.

10. The system of claim 8, wherein the plurality of light orifices are organized in a pseudorandom pattern.

11. The system of claim 10, wherein the plurality of points from the light orifices have a higher density at an edge of the pattern mask than a center of the pattern mask.

12. The system of claim 8, wherein the points from adjacent light orifices are separated by a pattern distance in the point cloud.

13. The system of claim 8, wherein the light source is an infrared laser.

14. A method comprising:
defining, by use of a processor, a point distribution of a plurality of points in a point cloud;
calculating positions of light orifices in a pattern mask disposed between the light source and the conical mirror, the pattern mask structured with a plurality of light orifices that each pass a light ray from a light source to a conical mirror, the plurality of light orifices arranged to correct a deformation pattern of the conical mirror wherein a latitude of each light orifice is calculated as an arc cosine of a coordinate of a vector parallel a central axis, and a plurality of light rays are reflected from the conical mirror to form a plurality of points in a point cloud;
generating the pattern mask; and
illuminating the conical mirror through the pattern mask with the light source.

\* \* \* \* \*